(12) United States Patent
Sebastian et al.

(10) Patent No.: US 10,578,738 B2
(45) Date of Patent: *Mar. 3, 2020

(54) CHIRPED COHERENT LASER RADAR SYSTEM AND METHOD

(71) Applicant: StereoVision Imaging, Inc., Calabasas, CA (US)

(72) Inventors: Richard Lee Sebastian, Frederick, MD (US); Kendall L. Belsley, Falls Church, VA (US)

(73) Assignee: StereoVision Imaging, Inc., Calabasas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/862,132

(22) Filed: Jan. 4, 2018

(65) Prior Publication Data

US 2018/0188369 A1    Jul. 5, 2018

Related U.S. Application Data

(63) Continuation of application No. 14/076,172, filed on Nov. 9, 2013, now Pat. No. 9,864,060, which is a continuation of application No. 13/079,260, filed on Apr. 4, 2011, now Pat. No. 8,582,085, which is a continuation of application No. 12/393,522, filed on Feb. 26, 2009, now Pat. No. 7,920,272, which is a continuation of application No. 11/353,123, filed on Feb. 14, 2006, now Pat. No. 7,511,824.

(60) Provisional application No. 60/651,989, filed on Feb. 14, 2005.

(51) Int. Cl.
*G01S 17/06* (2006.01)
*G01C 3/08* (2006.01)
*G01S 17/32* (2020.01)
*G01S 7/4911* (2020.01)
*G01S 7/481* (2006.01)

(52) U.S. Cl.
CPC ............ *G01S 17/06* (2013.01); *G01C 3/08* (2013.01); *G01S 7/4911* (2013.01); *G01S 17/32* (2013.01); *G01S 7/4814* (2013.01); *G01S 7/4818* (2013.01)

(58) Field of Classification Search
CPC ........ G01S 17/06; G01S 7/4911; G01S 17/32; G01S 7/4814; G01S 7/4818; G01C 3/08
See application file for complete search history.

(56) References Cited

U.S. PATENT DOCUMENTS 7,139,446 B2 * 11/2006 Slotwinski ............ G01S 7/4818
                                                                385/12

* cited by examiner

*Primary Examiner* — Hwa Andrew Lee
(74) *Attorney, Agent, or Firm* — Toering Patents PLLC (57) ABSTRACT

A laser radar system using collocated laser beams to unambiguously detects a range of a target and a range rate at which the target is moving relative to the laser radar system. Another aspect of various embodiments of the invention may relate to a laser radar system that uses multiple laser radar sections to obtain multiple simultaneous measurements (or substantially so), whereby both range and range rate can be determined without various temporal effects introduced by systems employing single laser sections taking sequential measurements. In addition, other aspects of various embodiments of the invention may enable faster determination of the range and rate of the target, a more accurate determination of the range and rate of the target, and/or may provide other advantages.

20 Claims, 6 Drawing Sheets

CHIRPED COHERENT LASER RADAR SYSTEM AND METHOD

CROSS-REFERENCE TO RELATED APPLICATIONS

This Application is a continuation application of U.S. patent application Ser. No. 14/076,172, filed on Nov. 9, 2013, now U.S. Pat. No. 9,864,060; which in turn is a continuation application of U.S. patent application Ser. No. 13/079,260, filed on Apr. 4, 2011, now U.S. Pat. No. 8,582,085; which in turn is a continuation application of U.S. patent application Ser. No. 12/393,522, filed on Feb. 26, 2009, now U.S. Pat. No. 7,920,272; which in turn is a continuation application of U.S. patent application Ser. No. 11/353,123, filed on Feb. 14, 2006, now U.S. Pat. No. 7,511,824; which claims priority to U.S. Provisional Patent Application No. 60/651,989, filed on Feb. 14, 2005, entitled "Chirped Coherent Laser Radar System and Method." Each of the foregoing applications is incorporated herein by reference in their entirety.

FIELD OF THE INVENTION

The invention relates generally to a measuring device and more particularly to a chirped coherent laser radar system.

BACKGROUND OF THE INVENTION

Various measuring devices for measuring linear distances using one or more laser radars are known. Such measuring devices may generate information related to a distance or range of a target from the measuring device and/or a velocity, or range rate, of the target relative to the measuring device. This range and range rate information may be useful in a variety of settings. For the purposes of this application the term range rate refers to the rate of change in the range between the target and the measuring device.

A typical measuring device may include, for example, a frequency modulated laser radar system. The system may include a laser source that emits a beam of electromagnetic radiation. The beam may be emitted at a frequency that is continuously varied, or chirped. In some instances, chirping the frequency may include sweeping the frequency between a lower frequency and an upper frequency (or vice versa) in a periodic manner (e.g. a sawtooth waveform, a triangle waveform, etc.). The beam may be divided into a target beam and a reference beam.

In conventional embodiments, the system may include a target interferometer and a reference interferometer. The target interferometer may receive the target beam, and may generate a target signal corresponding to a frequency difference between one portion of the target beam directed towards, and reflected from, the target, and another portion of the target beam that directed over a path with a known or otherwise fixed path length. The frequency difference may determined by the target interferometer based on an interference signal derived from the two portions of the target beam. The reference interferometer may receive the reference beam and may generate a reference signal corresponding to a frequency difference between two portions of the reference beam that may be directed over two separate fixed paths with a known path length difference. The frequency difference may be determined by the reference interferometer based on an interference signal derived from the two portions of the reference beam.

Generally, the system may include a processor. The processor may receive the target signal and the reference signal and may process these signals to determine the range between the target interferometer and the target. Range information determined based on the target signal and the reference signal may be used to determine a range rate of the target with respect to the target interferometer.

Conventional systems may be built, for example, as described in U.S. Pat. No. 5,114,226, entitled "3-DIMENSIONAL VISION SYSTEM UTILIZING COHERENT OPTICAL DETECTION," which is incorporated herein by reference in its entirety.

Conventional systems are typically limited in various aspects of operation. For example, these conventional systems are not able to provide range and/or range rate information instantaneously based on the target signal and reference signal, or unambiguously determine distance and velocity. These conventional systems are limited in other ways as well. These limitations may be exacerbated by various operating conditions such as, for example, target acceleration toward or away from the target interferometer, using an actuated optical element (e.g. a mirror or lens) to scan the target at high speeds, or other operating conditions.

In some configurations, beams produced by two laser sources may be combined to provide a beam of electromagnetic radiation that may then be divided into a reference beam and a target beam. In these configurations, the frequencies of the two laser sources may be counter chirped, or, in other words, the two frequencies may be chirped such that while a frequency of one of the laser sources is ascending toward an upper frequency, the other is descending toward a lower frequency, and vice versa. Systems utilizing such a configuration may suffer some or all of the drawbacks associated with single laser source systems, as well as other drawbacks unique to two laser source systems.

SUMMARY

One aspect of various embodiments of the invention may relate to a laser radar system that unambiguously detects a range of a target and a range rate at which the target is moving relative to the laser radar system. Another aspect of various embodiments of the invention may relate to a laser radar system that uses multiple laser radar sections to obtain multiple simultaneous measurements (or substantially so), whereby both range and range rate can be determined without various temporal effects introduced by systems employing single laser sections taking sequential measurements. In addition, other aspects of various embodiments of the invention may enable faster determination of the range and rate of the target, a more accurate determination of the range and rate of the target, and/or may provide other advantages.

In some embodiments of the invention, the laser radar system may emit a first target beam and a second target beam toward a target. The first target beam and the second target beam may be reflected by the target back toward the laser radar system. The laser radar system may receive the reflected first target beam and second target beam, and may determine at least one of a range of the target from the laser radar system, and a range rate of the target. In some embodiments of the invention, the laser radar system may include a first laser radar section, a second laser radar section, and a processor.

In some embodiments of the invention, the first laser radar section may generate a first target beam and a first reference beam. The first target beam and the first reference beam may be generated by a first laser source at a first frequency that may be modulated at a first chirp rate. The first target beam may be directed toward a measurement point on the target. The first laser radar section may combine one portion of the first target beam directed towards, and reflected from, the target with another portion of the first target beam, referred to as a local oscillator beam, directed over a path with a known or otherwise fixed path length. This may result in a combined first target beam.

According to various embodiments of the invention, the second laser radar section may be collocated and fixed with respect to the first laser radar section. More particularly, the relevant optical components for transmitting and receiving the respective laser beams are collocated and fixed. The second laser radar section may generate a second target beam and a second reference beam. The second target beam and the second reference beam may be generated by a second laser source at a second frequency that may be modulated at a second chirp rate. The second chirp rate may be different from the first chirp rate. This may facilitate one or more aspects of downstream processing, such as, signal discrimination, or other aspects of downstream processing. The second target beam may be directed toward the same measurement point on the target as the first target beam. The second laser radar section may combine one portion of the second target beam directed towards, and reflected from, the target, and another portion of the second target beam that directed over a path with a known or otherwise fixed path length. This results in a combined second target beam.

According to various embodiments of the invention, the processor receives the first and second combined target beams and measures a beat frequency caused by a difference in path length between each of the respective reflected target beams and its corresponding local oscillator beam (e.g., the first and second combined target beams), and by any Doppler frequency shift created by target motion relative to the laser radar system. The beat frequencies may then be combined linearly to generate unambiguous determinations of the range and the range rate of the target, so long as the beat frequencies between each of the respective local oscillator beams and the its reflected target beam correspond to simultaneous (or substantially simultaneous) temporal components of the reflected target beams. Simultaneous (or substantially simultaneous) temporal components of the reflected target beams may include temporal components of the target beams that: 1) have been incident on substantially the same portion of the target, 2) have been impacted by similar transmission effects, 3) have been directed by a scanning optical element under substantially the same conditions, and/or 4) share other similarities. The utilization of beat frequencies that correspond to simultaneous (or substantially simultaneous) temporal components of the reflected target beams for linear combination may effectively cancel any noise introduced into the data by environmental or other effects (see e.g. Equation (1)).

Since the combined target beams may be created by separately combining the first local oscillator beam and the second local oscillator beam with different target beams, or different portions of the same target beam, the first combined target beam and the second combined target beam may represent optical signals that would be present in two separate, but coincident, single source frequency modulated laser radar systems, just prior to final processing. For example, the combined target beams may represent optical signals produced by target interferometers in single source systems.

According to various embodiments, the target beams may be directed to and/or received from the target on separate optical paths. In some embodiments, these optical paths may be similar but distinct. In other embodiments the first target beam and the second target beam may be coupled prior to emission to create a combined target beam directed toward the target along a common optical path. In some embodiments, the combined target beam may be reflected by the target and may be received by the laser radar system along a reception optical path separate from the common optical path that directed the target beam toward the target. Such embodiments may be labeled "bistatic." Or, the combined target beam may be received by the laser radar system along the common optical path. These latter embodiments may be labeled "monostatic." Monostatic embodiments may provide advantages over their bistatic counterparts when operating with reciprocal optics. More particularly, monostatic embodiments of the invention may be less affected by differential Doppler effects and distortion due to speckle, among other things. Differential Doppler effects are created, for example, by a scanning mirror that directs the target beam to different locations on a target. Since different parts of the mirror are moving at different velocities, different parts of the target beam experience different Doppler shifts, which may introduce errors into the range and or range rate measurements. These effects have been investigated and analyzed by Anthony Slotwinski and others, for example, in NASA Langley Contract No. NAS1-18890 (May 1991) Phase II Final Report, Appendix K, submitted by Digital Signal Corporation, 8003 Forbes Place, Springfield, Va. 22151, which is incorporated herein by reference in its entirety.

In some instances, the first laser source and the second laser source may generate electromagnetic radiation at a first carrier frequency and a second carrier frequency, respectively. The first carrier frequency may be substantially the same as the second carrier frequency. This may provide various enhancements to the laser radar system, such as, for example, minimizing distortion due to speckle, or other enhancements.

In some embodiments, the first laser source and the second laser source may rely on, or employ, highly linearized components to generate their respective laser beams. To this end, the first laser source and the second laser source may be linearized on a frequent basis (e.g. each chirp), or in some embodiments continuously (or substantially so). This linearization may provide enhanced range measurement accuracy, or other enhancements, over conventional systems in which linearization may occur at startup, when an operator notices degraded system performance, when the operator is prompted to initiate linearization based on a potential for degraded performance, or when one or more system parameters fall out of tolerance, etc. Frequent and/or automated linearization may reduce mirror differential Doppler noise effects during high speed scanning and may maximize the effectiveness of dual chirp techniques for canceling out these and other noise contributions to range estimates.

In some embodiments of the invention, the laser radar system may determine the range and the range rate of the target with an increased accuracy when the range of the target from the laser radar system falls within a set of ranges between a minimum range and a maximum range. When the range of the target does not fall within the set of ranges, the accuracy of the laser radar system may be degraded. This degradation may be a result of the coherence lengths) of the first laser source and the second laser source, which is finite in nature. For example, the distance between the minimum range and the maximum range may be a function of the coherence length. The longer the coherence length of the first laser source and the second laser source, the greater the distance between the minimum range and the maximum range. Thus, increasing the coherence length of the first laser source and the second laser source may enhance range and range rate determinations by the laser radar system by providing the ability to make determinations over an enhanced set of ranges.

Accordingly, in some embodiments of the invention, the first laser source and the second laser source may emit electromagnetic radiation with an enhanced coherence length. For example, the first laser source and/or the second laser source may include a ring cavity laser system. The ring cavity laser system may provide electromagnetic radiation with one or more enhancements such as, for example, an increased coherence length, a more precise frequency control, a more precise chirp rate control, a more linear chirp, a relatively simple and/or compact optical configuration or other enhancements.

In some embodiments, the ring cavity system may include one or more optical elements that may form an optical cavity through which electromagnetic radiation may be circulated, an optical amplifier, and a frequency shifting device that may apply a frequency shift to the electromagnetic radiation circulating through the optical cavity. The frequency shifting device may include an acousto-optical modulator, a moving surface or other device. The acousto-optical modulator may apply a constant frequency shift to the electromagnetic radiation circulating through the optical cavity which may provide the electromagnetic radiation output by the ring cavity system with a substantially linear chirp. The acousto-optical modulator may include an acousto-optic Bragg cell. The ring cavity system may form a laser whose natural lasing mode produces electromagnetic radiation with a linearly varying optical frequency and enhanced coherence length.

In some embodiments of the invention, one of the chirp rates may be set equal to zero. In other words, one of the laser sources may emit radiation at a constant frequency. This may enable the laser source emitting at a constant frequency to be implemented with a simpler design, a small footprint, a lighter weight, a decreased cost, or other enhancements that may provide advantages to the overall system. In these embodiments, the laser radar section with chirp rate set equal to zero may be used to determine only the range rate of the target.

In some embodiments of the invention, the processor may linearly combine the first combined target beam and the second combined target beam digitally to generate the range signal and the range rate signal. For example, the processor may include a first detector and a second detector. The first detector may receive the first combined target beam and may generate a first analog signal that corresponds to the first combined target beam. The first analog signal may be converted to a first digital signal by a first converter. The processor may include a first frequency data module that may determine a first set of frequency data that corresponds to one or more frequency components of the first digital signal.

The second detector may receive the second combined target beam and may generate a second analog signal that corresponds to the second combined target beam. The second analog signal may be converted to a second digital signal by a second converter. The processor may include a second frequency data module that may determine a second set of frequency data that corresponds to one or more of frequency components of the second digital signal.

The first set of frequency data and the second set of frequency data may be received by a frequency data combination module. The frequency data combination module may generate a range rate signal and a range signal derived from the first set of frequency data and the second set of frequency data.

In other embodiments of the invention, the processor may mix the first combined target beam and the second combined target beam electronically to generate the range signal and the range rate signal. For example, the processor may include a modulator. The modulator may multiply the first analog signal generated by the first detector and the second analog signal generated by the second detector to create a combined analog signal. In such embodiments, the processor may include a first filter and a second filter that receive the combined analog signal. The first filter may filter the combined analog signal to generate a first filtered signal. The first filtered signal may be converted by a first converter to generate a range rate signal. The second filter may filter the combined analog signal to generate a second filtered signal. The second filtered signal may be converted by a second converter to generate a range signal.

According to other embodiments of the invention, the processor may mix the first combined target beam and the second combined target beam optically to generate the range signal and the range rate signal. For example, the processor may include a detector that receives the first combined target beam and the second combined target beam and generates a combined analog signal based on the detection of the first combined target beam and the second combined target beam. In such embodiments, the processor may include a first filter and a second filter that receive the combined analog signal. The first filter may filter the combined analog signal to generate a first filtered signal. The first filtered signal may be converted by a first converter to generate a range rate signal. The second filter may filter the combined analog signal to generate a second filtered signal. The second filtered signal may be converted by a second converter to generate a range signal.

DETAILED DESCRIPTION OF THE DRAWINGS

Figure 1:
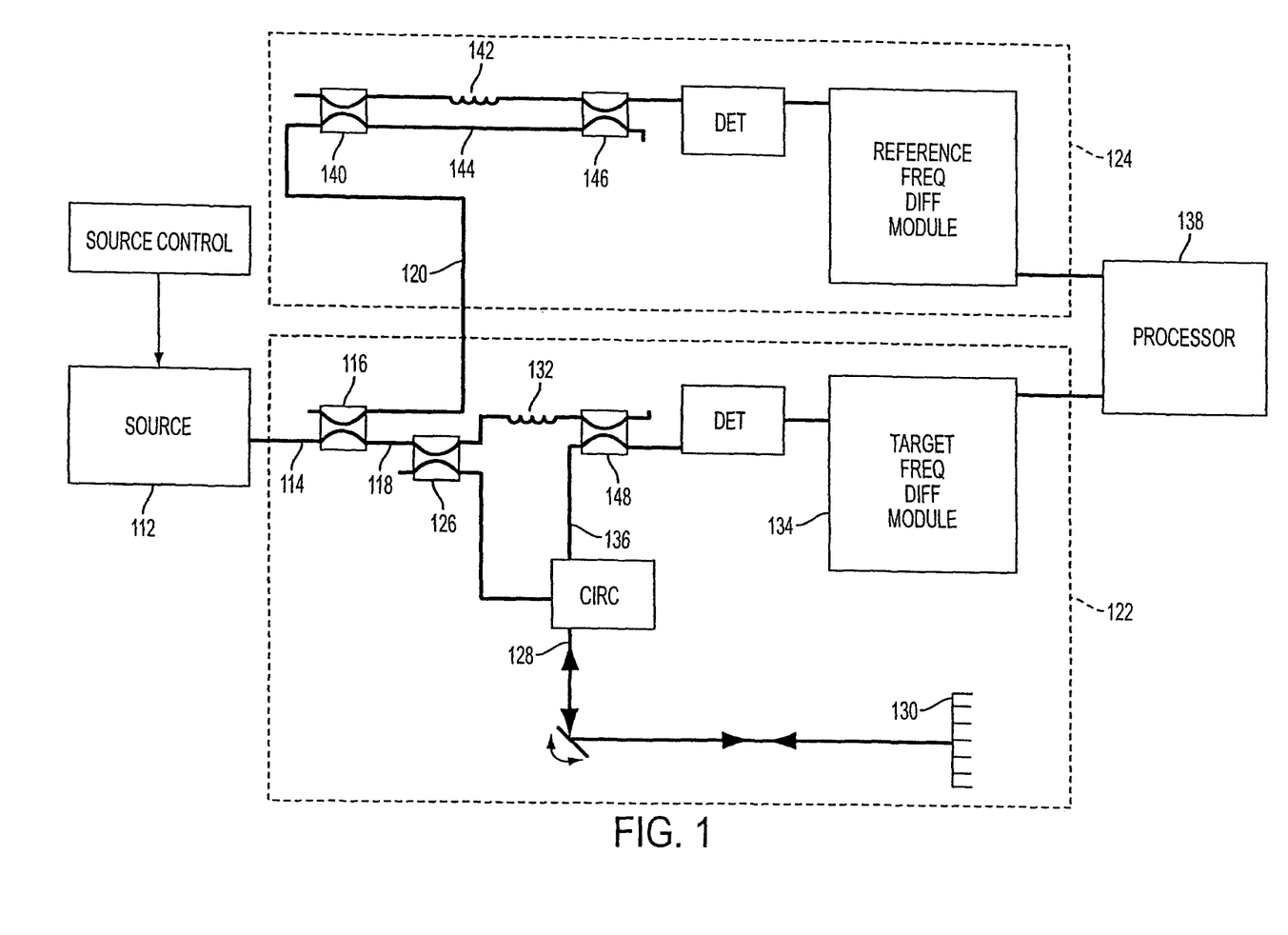
FIG. 1 illustrates a conventional laser radar system.

FIG. 1 illustrates a conventional frequency modulated laser radar system 110. System 110 typically includes a laser source 112 that emits a beam 114 of electromagnetic radiation. Beam 114 may be emitted at a frequency that is continuously varied, or chirped. In some instances, chirping the frequency may include sweeping the frequency between a lower frequency and an upper frequency (or vice versa) in a periodic manner (e.g. a sawtooth waveform, a triangle waveform, etc.). Beam 114 may be divided by an optical coupler 116 into a target beam 118 and a reference beam 120.

In conventional embodiments, system 110 may include a target interferometer 122 and a reference interferometer 124. Target interferometer 122 may receive target beam 118, and may divide the target beam at an optical coupler 126. Target interferometer 122 is typically used to generate a target signal that may depend upon a range of a target 130 from target interferometer 122. Target interferometer may accomplish this by directing one portion 128 of target beam 118 toward target 130, and the other portion 132 of target beam 118 to a target frequency difference module 134 over an optical path with a fixed path length. Portion 128 of target beam 118 may be reflected by target 130 and may be transmitted to target frequency difference module 134 via optical coupler 126 and an optical fiber 136. Portions 128 and 132 may then be combined at an optical coupler 148. Based on interference between portions 128 and 132 after combination at coupler 148, target frequency difference module 134 may generate the target signal corresponding to a beat frequency of portions 128 and 132 of target beam 118 due to the difference between their path lengths.

According to various embodiments of the invention, reference interferometer 124 may receive reference beam 120 and may generate a reference signal corresponding to a frequency difference between two portions of reference beam 124 that may be directed over two separate fixed paths with a known path length difference. More particularly, reference beam 120 may be divided by an optical coupler 140 into a first portion 142 and a second portion 144 and recombined at an optical coupler 146. First portion 142 may have a fixed optical path length difference relative to second portion 144. Based on interference between portions 142 and 144 after combination at coupler 146, reference frequency difference module 150 may generate the reference signal corresponding to a beat frequency of portions 142 and 144 of reference beam 120 caused by the fixed difference between their path lengths.

As will be appreciated, target interferometer 122 and reference interferometer 124 have been illustrated and described as Mach-Zehnder interferometers. However other interferometer configurations may be utilized. For example, target interferometer 122 and reference interferometer 124 may include embodiments wherein Michaelson-Morley interferometers may be formed.

In some embodiments, system 110 may include a processor 138. Processor 138 may receive the target signal and the reference signal and may process these signals to determine the range of target 130. Range information determined based on the target signal and the reference signal may be used to determine a range rate of target 130 with respect to target interferometer 122.

Figure 2:
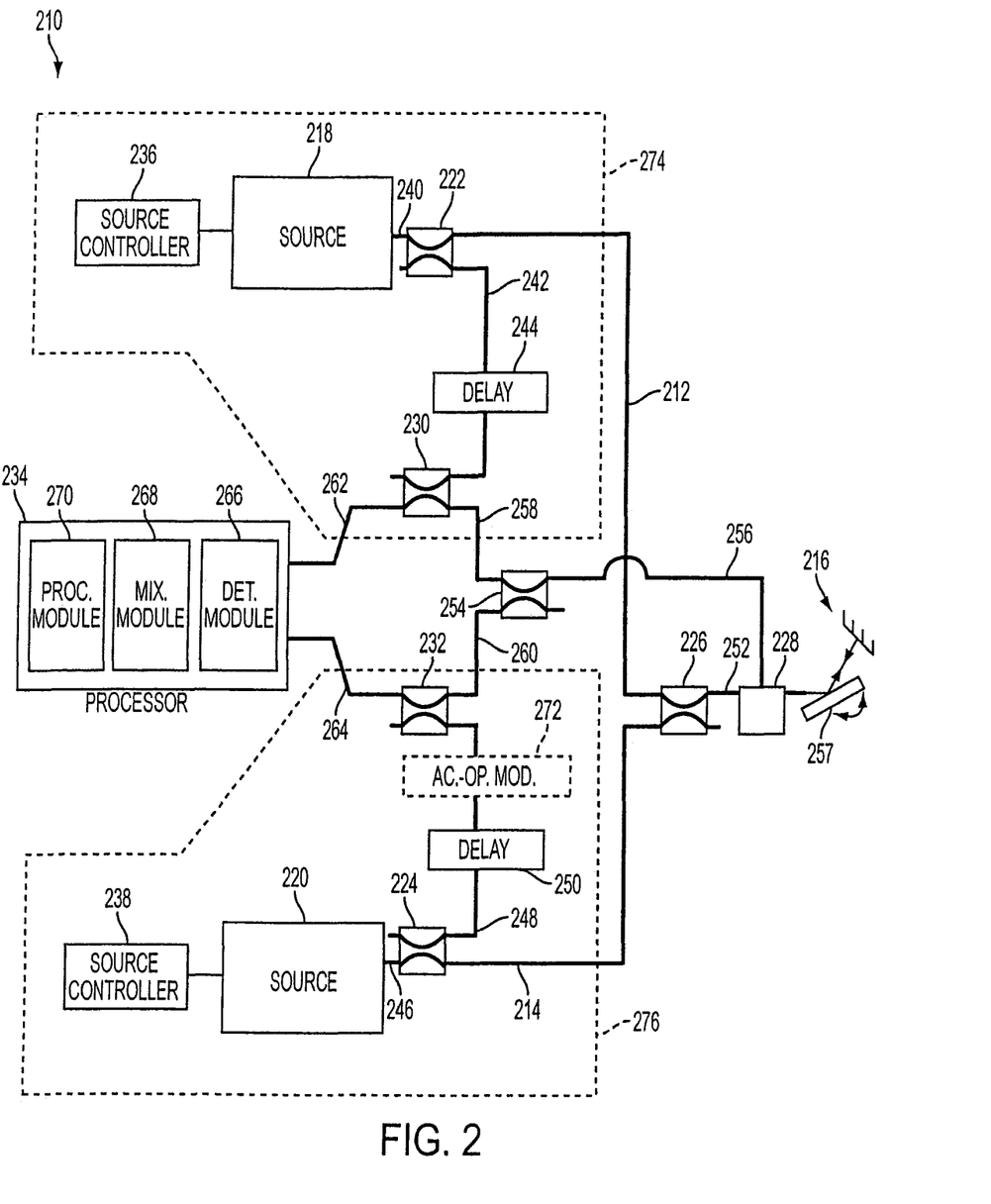
FIG. 2 illustrates a laser radar system according to one or more embodiments of the invention.

FIG. 2 illustrates an exemplary embodiment of a laser radar system 210 that employs two or more laser radar sections, each of which emits a target beam toward a target. For example, a first laser radar section 274 emits a first target beam 212 and a second laser radar section 276 emits a second target beam 214 toward a target 216. In some embodiments of the invention, first target beam 212 and second target beam 214 may be chirped to create a dual chirp system. According to various embodiments of the invention, laser section 274 may include a laser source controller 236, a first laser source 218, a first optical coupler 222, a first beam delay 244, a first local oscillator optical coupler 230, and/or other components. Second laser radar section 276 may include a laser source controller 238, a second laser source 220, a second optical coupler 224, a second beam delay 250, a second local oscillator optical coupler 232 and/or other components. For example, some or all of the components of each of laser radar sections 274 and 276 may be obtained as a coherent laser radar system from MetricVision™. Coherent laser radar systems from MetricVision™ may provide various advantages, such as enhanced linearity functionality, enhanced phase wandering correction, and other advantages to laser radar system 210 in determining the range and the range rate of target 216.

In some embodiments of the invention, first target beam 212 and second target beam 214 may be reflected by target 216 back toward laser radar system 210. Laser radar system 210 may receive first target beam 212 and second target beam 214, and may determine at least one of a range of target 216 from laser radar system 210, and a range rate of target 216.

According to various embodiments of the invention, first laser source 218 may have a first carrier frequency. First laser source 218 may emit a first laser beam 240 at a first frequency. The first frequency may be modulated at a first chirp rate. The first frequency may be modulated electrically, mechanically, acousto-optically, or otherwise modulated as would be apparent. First laser beam 240 may be divided by first optical coupler 222 into first target beam 212 and a first local oscillator beam 242. First local oscillator beam 242 may be held for a first delay period at a first beam delay 244.

In some embodiments of the invention, second laser source 220 may emit a second laser beam 246 at a second frequency. The second frequency may be modulated at a second chirp rate different from the first chirp rate. The second frequency may be modulated electrically, mechanically, acousto-optically, or otherwise modulated. The first chirp rate and the second chirp rate may create a counter chirp between first laser beam 240 and second laser beam 246.

In some instances, the second carrier frequency may be substantially the same as the first carrier frequency. For example, in some embodiments the percentage difference between the first baseline frequency and the second baseline frequency is less than 0.05%. This may provide various enhancements to laser system 210, such as, for example, minimizing distortion due to speckle, or other enhancements. Second laser beam 246 may be divided by second optical coupler 224 into a second target beam 214 and a second local oscillator beam 248. Second local oscillator beam 248 may be held for a second delay period at a second beam delay 250. The second delay period may be different than the first delay period.

In some embodiments, the output(s) of first laser source 218 and/or second laser source 220 (e.g. first laser beam 240 and/or second laser beam 246) may be linearized using mechanisms provided in, for example, METRICVISION™ Model MV200. Phase wandering of the output(s) of first laser source 218 and/or second laser source 220 may corrected using mechanisms provided in, for instance, METRICVISION™ Model MV200.

In some embodiments of the invention, laser radar system 210 may determine the range and the range rate of target 216 with an increased accuracy when the range of target 216 from laser radar system 210 falls within a set of ranges between a minimum range and a maximum range. When the range of target 216 does not fall within the set of ranges, the accuracy of laser radar system 210 may be degraded.

According to various embodiments of the invention, first beam delay 244 and second beam delay 250 may be adjustable. Adjusting first beam delay 244 and second beam delay 250 may enable laser radar system 210 to be adjusted to bring the set of ranges over which more accurate determinations may be made closer to, or further away from, laser radar system 210. First beam delay 244 and the second beam delay 250 may be adjusted to ensure that the range of target 216 falls within the set of ranges between the minimum range and the maximum range so that the range and the range rate of target 216 may be determined accurately. First beam delay 244 and second beam delay 250 may be adjusted by a user, or in an automated manner.

The degradation of determinations of range and range rate when the range of target 216 is outside of the set of ranges may be a result of the finite nature of the coherence length of first laser source 218 and second laser source 220. For example, the distance between the minimum range and the maximum range may be a function of the coherence length. The longer the coherence length of first laser source 218 and second laser source 220, the greater the distance between the minimum range and the maximum range may be. Thus, increasing the coherence length of first laser source 218 and second laser source 220 may enhance range and range rate determinations by laser radar system 210 by providing the ability to make determinations over an enhanced set of ranges.

In some embodiments of the invention, first local oscillator beam 242 may be divided into a plurality of first local oscillator beams and second local oscillator beam 248 may be divided into a plurality of second local oscillator beams. In such instances, laser radar system 210 may include a plurality of beam delays that may apply delays of varying delay periods to the plurality of first local oscillator beams and the plurality of second local oscillator beams. This may ensure that one of the plurality of first local oscillator beams and one of the plurality of second local oscillator beams may have been delayed for delay periods that may enable the range and range rate of the target to determined accurately.

Figure 3:
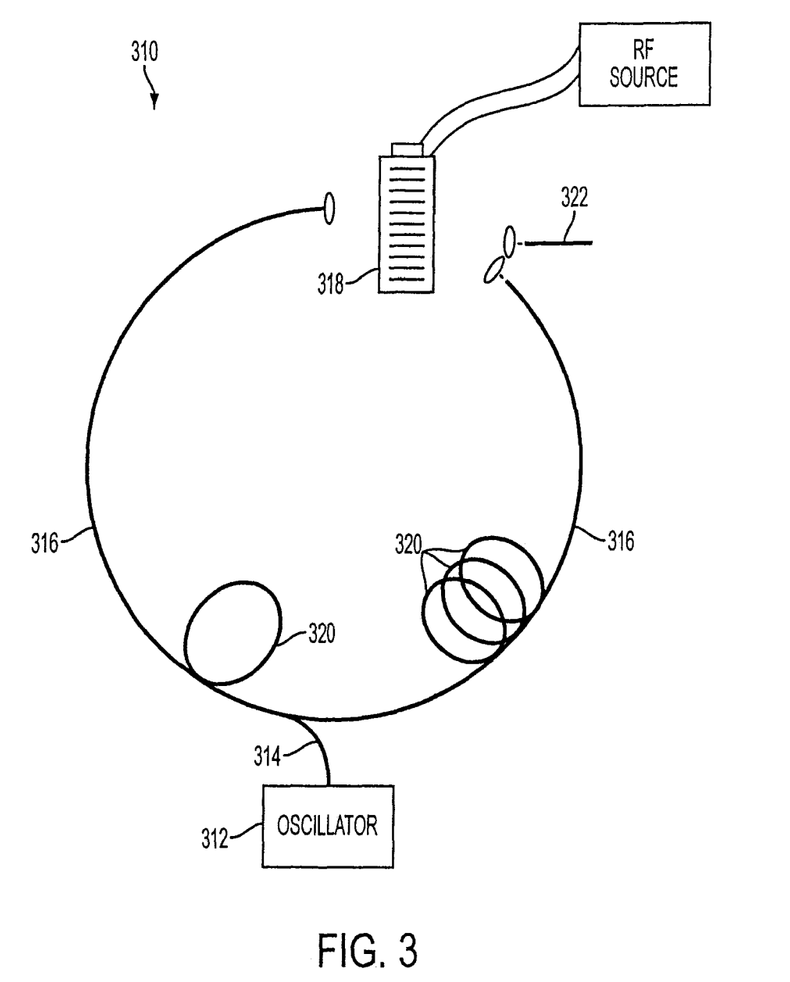
FIG. 3 illustrates a ring cavity system according to one or more embodiments of the invention.

Accordingly, in some embodiments of the invention, first laser source 218 and second laser source 220 may emit chirped electromagnetic radiation with an enhanced coherence length. Examples of such laser sources are described in U.S. Pat. No. 4,586,184 entitled "ACOUSTICALLY CONTROLLED FREQUENCY SHIFTED CAVITY FOR ELECTROMAGNETIC RADIATION," which is incorporated herein by reference in its entirety. For example, first laser source 218 and/or second laser source 220 may include a ring cavity system. FIG. 3 illustrates an exemplary embodiment of a ring cavity system 310. Ring cavity system 310 may provide electromagnetic radiation with various enhancements such as, for example, an increased coherence length, a more precise frequency control, a more precise chirp rate control, or other enhancements. Ring cavity system 310 may include a ring fiber 316, an frequency shifting device 318, one or more optical amplifiers 320, an output fiber 322, and/or other components.

According to some embodiments, the ring cavity system 310 forms a laser oscillator with the optical amplifier(s) 320 providing sufficient gain to spontaneously generate lasing output in fiber 322. Because the oscillator may not be modulated in the conventional sense, the oscillator may be constructed to include an enhanced instantaneous optical bandwidth operation. For example, the instantaneous optical bandwidth may be relatively narrow, which may produce electromagnetic radiation with a relatively long coherence length. Ring cavity system 310 may include frequency shifting device 318 within the optical cavity formed by ring fiber 316. Frequency shifting device 318 may shift the frequency of the electromagnetic radiation as the electromagnetic radiation passes through the optical cavity.

In some instances, frequency shifting device 318 may include acousto-optic modulator, such as an acousto-optic Bragg cell, or other acousto-optic modulator, or other frequency shifting devices. The frequency shift applied to the electromagnetic radiation applied by frequency shifting device 318 may be adjusted by an RF source 324. In some cases, acousto-optic Bragg cell 318 may provide a constant frequency shift to the electromagnetic radiation to produce a substantially linear chirp. Output radiation may be output from ring cavity system 310 via output fiber 322. It may be appreciated that although the ring cavity system has been described generally as being implemented using optical fibers, that the ring cavity system could alternatively be implemented using other optical elements (e.g. mirrors, lenses, alternative amplifier elements, etc.).

Ring cavity system 310 may additionally incorporate further enhancements (not shown) such as a switch within the cavity that allows the electromagnetic radiation within the cavity to be dumped from the ring and/or external electromagnetic radiation to be injected into the cavity. Such enhancements may, for example, allow for enhanced control over the operation of the laser oscillator by stopping and/or starting lasing at particular wavelengths or at particular times.

According to various embodiments, first target beam 212 and second target beam 214 may be directed and/or received from target 216 on separate optical paths. In some embodiments, these optical paths may be similar but distinct. In other embodiments, first target beam 212 and second target beam 214 may be coupled by a target optical coupler 226 into a combined target beam 252 prior to emission that may be directed toward target 216 along a common optical path. In some embodiments, combined target beam 252 (or first target beam 212 and second target beam 214, if directed toward target 216 separately) may be reflected by target 216 and may be received by laser radar system 210 along a reception optical path separate from the common optical path that directed combined target beam 252 toward target 216. Such embodiments may be labeled "bistatic." Or, combined target beam 252 may be received by laser radar system 210 as a reflected target beam 256 along the common optical path. These latter embodiments may be labeled "monostatic." Monostatic embodiments may provide advantages over their bistatic counterparts when operating with reciprocal optics. In monostatic embodiments, the common optical path may include optical member 228 that may provide a common port for emitting combined target beam 252 and receiving reflected target beam 256. Optical member 228 may include an optical circulator, an optical coupler or other optical member as would be apparent.

In some embodiments, the common optical path may include a scanning element 257. Scanning element 257 may include an optical element such as, for instance, a mirror, a lens, an antennae, or other optical elements that may be oscillated, rotated, or otherwise actuated to enable combined target beam 252 to scan target 216. In some instances, scanning element 257 may enable scanning at high speeds. In conventional systems, scanning elements may be a source of mirror differential Doppler noise effects due to speckle or other optical effects that may degrade the accuracy of these systems. However, because various embodiments of laser radar system 210 use simultaneous measurements (or substantially so) to unambiguously determine range and range rate, inaccuracies otherwise induced by high speed scanning may be avoided.

In some embodiments of the invention, a target optical coupler 254 may divide reflected target beam 256 into a first reflected target beam portion 258 and a second reflected target beam portion 260. First local oscillator optical coupler 230 may combine first local oscillator beam 242 with first reflected target beam portion 258 into a first combined target beam 262. Second local oscillator optical coupler 232 may combine second local oscillator beam 248 with second reflected target beam portion 260 into a second combined target beam 264. In some embodiments not shown in the drawings, where, for example first target beam 212 and second target beam 214 may be directed to and/or received from target 216 separately, first local oscillator optical coupler 230 may combine first target beam 212 that is reflected with first local oscillator beam 242 to create first combined target beam 262, and second target beam 214 that is reflected may be combined with second local oscillator beam 248 to create second combined target beam 264.

Because first local oscillator beam 242 and second local oscillator beam 248 may be combined with different target beams, or different portions of the same target beam (e.g. reflected target beam 256), first combined target beam 262 and second combined target beam 264 may represent optical signals that would be present in two separate, but coincident, single laser source frequency modulated laser radar systems, just prior to final processing. For example, laser source controller 236, first laser source 218, first optical coupler 222, first beam delay 244, and first local oscillator optical coupler 230 may be viewed as a first laser radar section 274 that may generate first combined target beam 262 separate from second combined target beam 264 that may be generated by a second laser radar section 276. Second laser radar section 276 may include laser source controller 238, second laser source 220, second optical coupler 224, second beam delay 250, and second local oscillator optical coupler 232.

In some embodiments, laser radar system 210 may include a processor 234. Processor 234 may include a detection module 266, a mixing module 268, a processing module 270, and/or other modules. The modules may be implemented in hardware (including optical and detection components), software, firmware, or a combination of hardware, software, and/or firmware. Processor 234 may receive first combined target beam 262 and second combined target beam 264. Based on first combined target beam 262 and second combined target beam 264, processor 234 may generate the range signal and the range rate signal. Based on the range signal and the range rate signal, the range and the range rate of target 216 may be unambiguously determined.

In some embodiments of the invention, processor 234 may determine a first beat frequency of first combined local oscillator beam 262. The first beat frequency may include a difference in frequency, attributable to a difference in path length, of first local oscillator beam 242 and the component of reflected target beam 256 that corresponds to first target beam 212 that has been reflected from target 216. Processor 234 may determine a second beat frequency of second combined local oscillator beam 264. The second beat frequency may include a difference in frequency, attributable to a difference in path length, of second local oscillator beam 248 and the component of reflected target beam 256 that corresponds to second target beam 214 that has been reflected from target 216. The first beat frequency and the second beat frequency may be determined simultaneously (or substantially so) to cancel noise introduced by environmental or other effects. One or more steps may be taken to enable the first beat frequency and the second beat frequency to be distinguished from other frequency components within first combined target beam 262, other frequency components within second combined target beam 264, and/or each other. For example, these measures may include using two separate chirp rates as the first chirp rate and the second chirp rate, delaying first local oscillator beam 242 and second local oscillator beam 250 for different delay times at first beam delay 244 and second beam delay 250, respectively, or other measures may be taken.

It will be appreciated that while FIG. 2 illustrates an exemplary embodiment of the invention implemented primarily using optical fibers and optical couplers, this embodiment is in no way intended to be limiting. Alternate embodiments within the scope of the invention exist in which other optical elements such as, for example, prisms, mirrors, half-mirrors, beam splitters, dichroic films, dichroic prisms, lenses, or other optical elements may be used to direct, combine, direct, focus, diffuse, amplify, or otherwise process electromagnetic radiation.

According to various embodiments of the invention, processor 234 may mix first combined target beam 262 and second combined target beam 264 to produce a mixed signal. The mixed signal may include a beat frequency sum component that may correspond to the sum of the first beat frequency and the second beat frequency, and a beat frequency difference component that may correspond to the difference between the first beat frequency and the second beat frequency. For a target having constant velocity, first laser beam 240 and second laser beam 246 beat frequencies may be described as follows:

$$f_1(t) = \frac{4\pi v}{\lambda_1} + 2\pi\gamma_1(R - RO_1), \text{ and} \qquad (1)$$

$$f_2(t) = \frac{4\pi v}{\lambda_2} + 2\pi\gamma_2(R - RO_2), \text{ respectively,} \qquad (2)$$

where $f_1(t)$ represents the first beat frequency, $f_2(t)$ represents the second beat frequency, $\lambda_1$ and $\lambda_2$ are the two optical wavelengths, v is the target velocity, $\gamma_1$ and $\gamma_2$ are proportional to the respective chirp rates, R is the measured range and $RO_1$ and $RO_2$ represent the range offsets for the two laser radars. Now assume that $\gamma_1 = \gamma_2 = \gamma$. We may subtract the equations to yield $$f_1(t) - f_2(t) = 2\pi R(\gamma_1 - \gamma_2) - 2\pi(\gamma_1 RO_1 - \gamma_2 RO_2) \qquad (3)$$

Rearranging (3) we obtain $$R = \frac{(f_1(t) - f_2(t))}{2\pi(\gamma_1 - \gamma_2)} + \frac{(\gamma_1 RO_1 - \gamma_2 RO_2)}{(\gamma_1 - \gamma_2)} \qquad (4)$$

as the corrected range measurement. Similarly we may combine (1) and (2) to obtain the expression, $$v = \frac{\lambda}{4\pi}\left(\frac{f_1(t) - \frac{\gamma_1}{\gamma_2}f_2(t)}{1 - \frac{\gamma_1}{\gamma_2}}\right) + \frac{\lambda\gamma_1}{2}\left(\frac{RO_1 - RO_2}{1 - \frac{\gamma_1}{\gamma_2}}\right), \qquad (5)$$

which provides a measure of the target velocity.

According to various embodiments of the invention, the beat frequency sum component, described above in Equation 4, may be filtered from the mixed signal to produce a range signal. From the beat frequency sum component included in the range signal (e.g. f1(t)+f2(t)), a determination of the distance from laser radar system 210 to target 216 may be made. The determination based on the range signal may be unambiguous, and may not depend on either the instantaneous behavior, or the average behavior of the Doppler frequency shift (e.g. v/λ).

In some embodiments, the beat frequency difference component, described above in Equation 4, may be filtered from the mixed signal to produce a range rate signal. From the beat frequency difference component included in the range rate signal (e.g. Error! Objects cannot be created from editing field codes.) a determination of the range rate of target 216 may be unambiguously made. To determine the range rate of target 216, $$f_1(t) - \frac{\gamma_1}{\gamma_2} f_2(t)$$

may be represented as a value proportional to a chirp rate difference between the first chirp rate and the second chirp rate. This may enable the Doppler shift information to be extracted, which may represent an instantaneous velocity of target 216.

In some embodiments of the invention, the second chirp rate may be set to zero. In other words, second laser source 218 may emit radiation at a constant frequency. This may enable second laser source 218 to be implemented with a simpler design, a small footprint, a lighter weight, a decreased cost, or other enhancements that may provide advantages to the overall system. In such embodiments, laser radar system 210 may include a frequency shifting device. The frequency shifting device may include an acousto-optical modulator 272, or other device. Acousto-optical modulator 272 may provide a frequency offset to second local oscillator beam 248, which may enhance downstream processing. For example, the frequency offset may enable a stationary target beat frequency between second local oscillator beam 248 and second reflected target beam portion 260 representative of a range rate of a stationary target to be offset from zero so that the a direction of the target's movement, as well as a magnitude of the rate of the movement, may be determined from the beat frequency. This embodiment of the invention has the further advantage that it may allow for continuous monitoring of the target range rate, uninterrupted by chirp turn-around or fly-back. Chirp turn-around or fly-back may create time intervals during which accurate measurements may be impossible for a chirped laser radar section. In these embodiments, laser radar section 276 may only determine the range rate of target 216 while laser radar system 210 retains the ability to measure both range and range rate.

Figure 4:
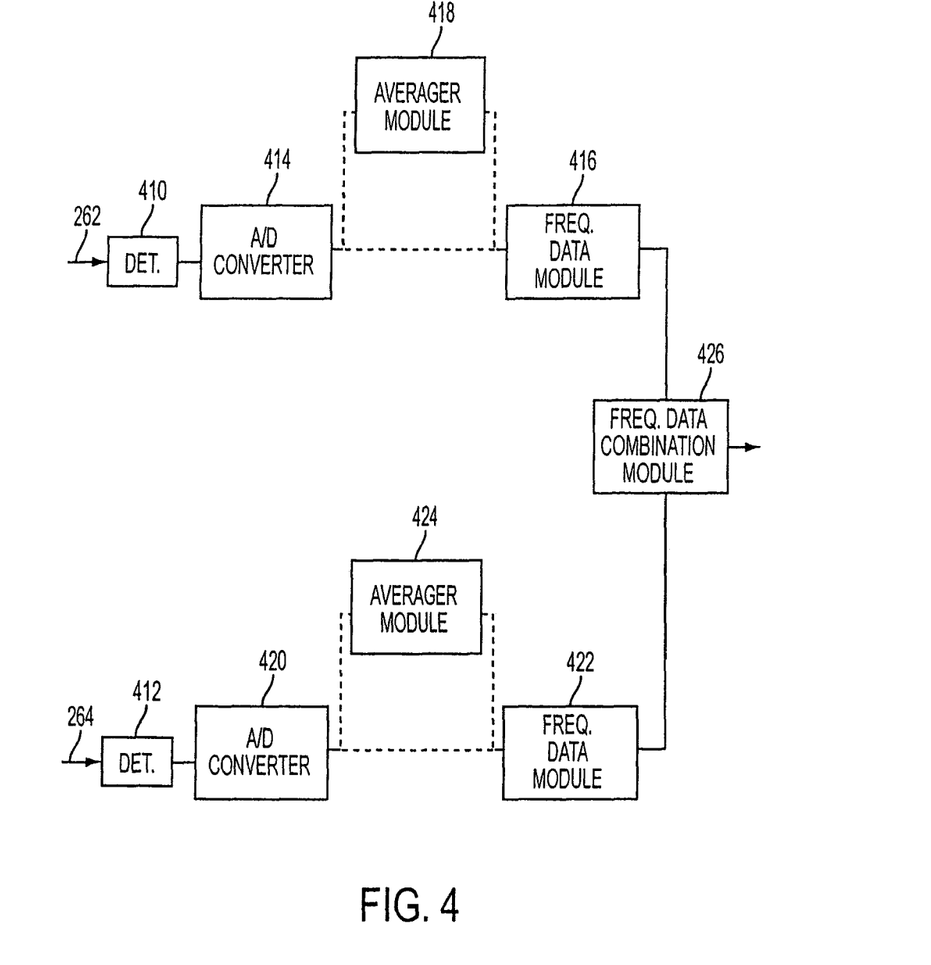
FIG. 4 illustrates a processor that digitally mixes two combined target beams according to one or more embodiments of the invention.

FIG. 4 illustrates a processor 234 according to one embodiment of the invention. Processor 234 may mix first combined target beam 262 and second combined target beam 264 digitally. For example, processor 234 may include a first detector 410 and a second detector 412. The first detector 410 may receive first combined target beam 262 and may generate a first analog signal that corresponds to first combined target beam 262. The first analog signal may be converted to a first digital signal by a first converter 414. Processor 234 may include a first frequency data module 416 that may determine a first set of frequency data that corresponds to one or more frequency components of the first digital signal. In some instances, the first digital signal may be averaged at a first averager module 418. In such instances, the averaged first digital signal may then be transmitted to first frequency data module 416.

Second detector 412 may receive second combined target beam 264 and may generate a second analog signal that corresponds to second combined target beam 264. The second analog signal may be converted to a second digital signal by a second converter 420. Processor 234 may include a second frequency data module 422 that may determine a second set of frequency data that corresponds to one or more of frequency components of the second digital signal. In some instances, the second digital signal may be averaged at a second averager module 424. In such instances, the averaged second digital signal may then be transmitted to second frequency data module 422.

The first set of frequency data and the second set of frequency data may be received by a frequency data combination module 426. Frequency data combination module 426 may linearly combine the first set of frequency data and the second set of frequency data, and may generate a range rate signal and a range signal derived from the mixed frequency data.

Figure 5:
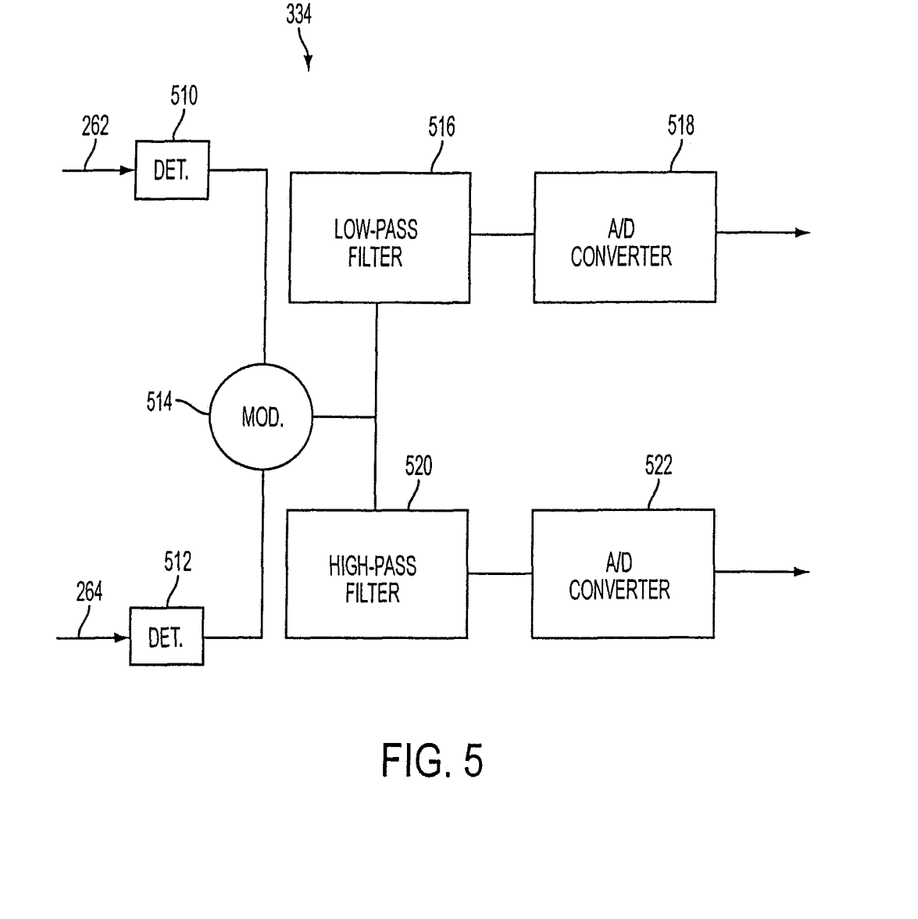
FIG. 5 illustrates a processor that electrically mixes two combined target beams according to one or more embodiments of the invention.

FIG. 5 illustrates a processor 234 according to another embodiment of the invention. Processor 234 may include a first detector 510 and a second detector 512 that may receive first combined target beam 262 and second combined target beam 264, respectively. First detector 510 and second detector 512 may generate a first analog signal and a second analog signal associated with first combined target beam 262 and second combined target beam 264, respectively. Processor 234 may mix first combined target beam 262 and second combined target beam 264 electronically to generate the range signal and the range rate signal. For example, processor 234 may include a modulator 514. Modulator 514 may multiply the first analog signal generated by first detector 510 and the second analog signal generated by second detector 512 to create a combined analog signal. In such embodiments, processor 234 may include a first filter 516 and a second filter 518 that receive the combined analog signal. First filter 516 may filter the combined analog signal to generate a first filtered signal. In some instances, first filter 516 may include a low-pass filter. The first filtered signal may be converted by a first converter 520 to generate the range rate signal. Second filter 518 may filter the combined analog signal to generate a second filtered signal. For instance, second filter 518 may include a high-pass filter. The second filtered signal may be converted by a second converter 522 to generate the range signal.

Figure 6:
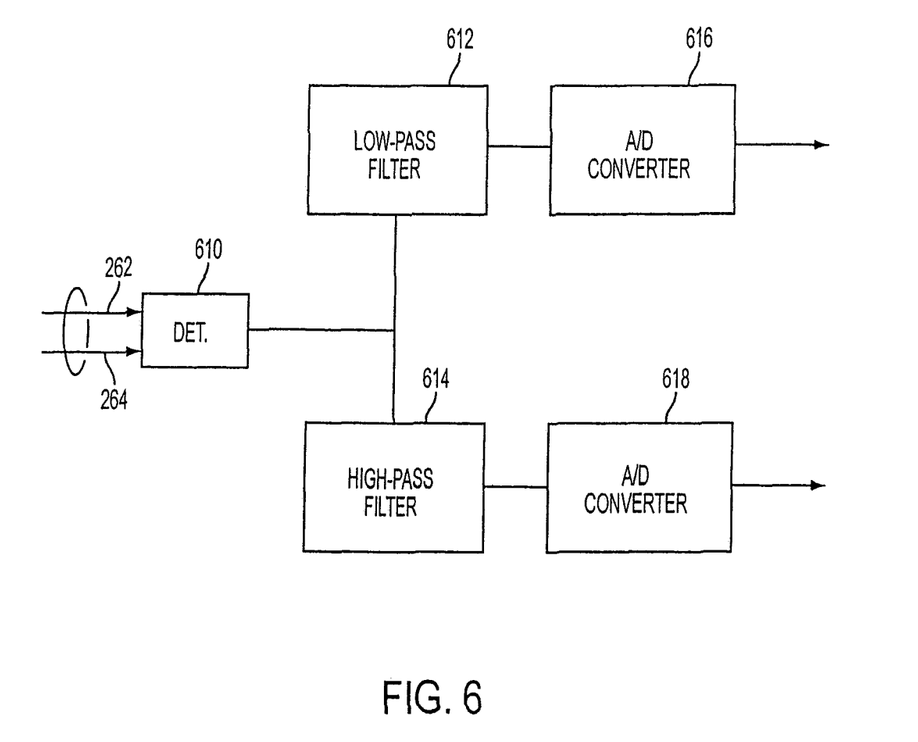
FIG. 6 illustrates a processor that optically mixes two combined target beams according to one or more embodiments of the invention.

FIG. 6 illustrates a processor 234 according to yet another embodiment of the invention. Processor 234 may mix first combined target beam 262 and second combined target beam 264 optically to generate the range signal and the range rate signal. For example, processor 234 may include a detector 610 that receives first combined target beam 262 and second combined target beam 264 and generates a combined analog signal based on the detection. In such embodiments, processor 234 may include a first filter 612 and a second filter 614 that receive the combined analog signal. First filter 612 may filter the combined analog signal to generate a first filtered signal. First filter 612 may include a low-pass filter. The first filtered signal may be converted by a first converter 616 to generate the range rate signal. Second filter 614 may filter the combined analog signal to generate a second filtered signal. Second filter 14 may include a

What is claimed is:

1. A method for measuring motion aspects of a target, the method comprising:
   generating a first laser beam at a first frequency that varies at a first chirp rate;
   generating a second laser beam at a second frequency;
   causing the first laser beam to be incident on a location of the target;
   causing the second laser beam to be incident on the location of the target;
   receiving a first reflected portion of the first laser beam from the target;
   receiving a second reflected portion of the second laser beam from the target; and
   combining the first reflected portion of the first laser beam with the second reflected portion of the second laser beam to determine at least two independent motion aspects of the target, wherein combining the first reflected portion of the first laser beam with the second reflected portion of the second laser beam comprises:
      electronically combining the first reflected portion of the first laser beam with the second reflected portion of the second laser beam, or
      optically combining the first reflected portion of the first laser beam with the second reflected portion of the second laser beam, or
      digitally combining the first reflected portion of the first laser beam with the second reflected portion of the second laser beam.

2. The method of claim 1, wherein causing the second laser beam to be incident on the location of the target comprises:
   causing the second laser beam to be coincident with the first laser beam on the location of the target.

3. The method of claim 1, wherein the second frequency of the second laser beam varies at a second chirp rate, wherein the second chirp rate is different from the first chirp rate.

4. The method of claim 3, wherein the first chirp rate has the same magnitude as second chirp rate.

5. The method of claim 3, wherein generating a first laser beam at a first frequency that varies at a first chirp rate comprises
   increasing, during a first time period, the first frequency of the first laser beam by the first chirp rate; and
   decreasing, during a second time period, the first frequency of the first laser beam by the first chirp rate.

6. The method of claim 5, wherein generating a second laser beam at a second frequency comprises
   decreasing, during the first time period, the second frequency of the second laser beam by the second chirp rate; and
   increasing, during the second time period, the second frequency of the second laser beam by the second chirp rate.

7. The method of claim 6, wherein the first time period and the second time period have a same duration.

8. The method of claim 1, further comprising:
   combining the first laser beam with the second laser beam prior to causing the first laser beam and the second laser beam to be incident on the target.

9. The method of claim 1, wherein combining the first reflected portion of the first laser beam with the second reflected portion of the second laser beam to determine at least two independent motion aspects of the target comprises:
   determining at least a range of the target.

10. The method of claim 1, wherein combining the first reflected portion of the first laser beam with the second reflected portion of the second laser beam to determine at least two independent motion aspects of the target comprises:
    unambiguously determining a range of the target and a Doppler velocity of the target.

11. A method for determining a distance between a laser system and a target, the method comprising:
    generating, from a first laser source, a first laser beam having a first frequency;
    generating, from a second laser source, a second laser beam having a second frequency;
    chirping up the first frequency of the first laser beam at a first chirp rate while chirping down the second frequency of the second laser beam at a second chirp rate;
    directing the first laser beam and the second laser beam to be incident on the target;
    receiving a first reflected portion of the first laser beam from the target and a second reflected portion of the second laser beam from the target; and
    combining the first reflected portion of the first laser beam with the second reflected portion of the second laser beam to determine at least a range to the target, wherein combining the first reflected portion of the first laser beam with the second reflected portion of the second laser beam comprises:
       electronically combining the first reflected portion of the first laser beam with the second reflected portion of the second laser beam, or
       optically combining the first reflected portion of the first laser beam with the second reflected portion of the second laser beam, or
       digitally combining the first reflected portion of the first laser beam with the second reflected portion of the second laser beam.

12. The method of claim 11, further comprising:
    chirping down the first frequency at a third chirp rate while chirping up the second frequency at a fourth chirp rate.

13. The method of claim 11, wherein the first chirp rate and the second chirp rate are different from one another.

14. The method of claim 11, wherein the first chirp rate and the second chirp rate are substantially the same.

15. The method of claim 12, wherein the first chirp rate and the third chirp rate are different from one another.

16. The method of claim 12, wherein the first chirp rate and the third chirp rate are substantially the same.

17. The method of claim 12, wherein the second chirp rate and the fourth chirp rate are different from one another.

18. The method of claim 12, wherein the second chirp rate and the fourth chirp rate are substantially the same.

19. The method of claim 11, further comprising:
    combining the first laser beam with the second laser beam.

20. The method of claim 19, wherein directing the first laser beam and the second laser beam to be incident on the target comprises directing the combined first and second laser beams to be coincident on the target.

* * * * *